(12) United States Patent
Brown (10) Patent No.: US 9,921,066 B2
(45) Date of Patent: Mar. 20, 2018

(54) SYSTEMS AND METHODS FOR ANALYZING THE USE OF MOBILE RESOURCES

(71) Applicant: TELOGIS, INC., Aliso Veijo, CA (US)

(72) Inventor: Steven T. Brown, Torrington, CT (US)

(73) Assignee: Telogis, Inc., Aliso Viejo, CA (US)

( * ) Notice: Subject to any disclaimer, the term of this patent is extended or adjusted under 35 U.S.C. 154(b) by 0 days.

(21) Appl. No.: 15/069,870

(22) Filed: Mar. 14, 2016

(65) Prior Publication Data

US 2016/0364660 A1    Dec. 15, 2016

Related U.S. Application Data

(63) Continuation of application No. 13/682,466, filed on Nov. 20, 2012, now abandoned, which is a
(Continued)

(51) Int. Cl.
| | |
|---|---|
| *G01C 21/20* | (2006.01) |
| *G08G 1/00* | (2006.01) |
| *G01C 21/34* | (2006.01) |
| *G08G 1/0968* | (2006.01) |
| *G06Q 10/04* | (2012.01) |
| *G06Q 10/06* | (2012.01) |

(Continued)

(52) U.S. Cl.
CPC ............ *G01C 21/20* (2013.01); *G01C 21/00* (2013.01); *G01C 21/34* (2013.01); *G01C 21/3415* (2013.01); *G06Q 10/047* (2013.01); *G06Q 10/06* (2013.01); *G06Q 10/063* (2013.01); *G06Q 10/06311* (2013.01); *G06Q 50/30* (2013.01); *G08G 1/0968* (2013.01); *G08G 1/20* (2013.01); *G06Q 10/083* (2013.01)

(58) Field of Classification Search
None
See application file for complete search history.

(56) References Cited

U.S. PATENT DOCUMENTS

| | | | | |
|---|---|---|---|---|
| 4,642,775 A | * | 2/1987 | Cline ..................... | G01C 21/00 |
| | | | | 701/528 |
| 5,559,707 A | * | 9/1996 | DeLorme ............... | G01C 21/20 |
| | | | | 340/990 |

(Continued)

OTHER PUBLICATIONS

Chuah et al. (2005). Routing for a Just-in-Time Supply Pickup and Delivery System. Transportation Science, 39(3), 328-339.
(Continued)

*Primary Examiner* — Gurkanwaljit Singh (57) ABSTRACT

A system for analyzing the use of a mobile resource, such as a vehicle, includes a central processing unit adapted to receive a plurality of geographic locations and create an optimal travel route between the geographic locations, and an analyzer device incorporating global positioning satellite (GPS) technology being positionable with a mobile resource for comparing an actual route traveled by the mobile resource with the optimal travel route created by the central processing unit. The central processing unit includes mobile resource management software stored therein adapted to use pre-selected criteria for creating the optimal travel route. The pre-selected criteria may include time, distance, cost, load parameters, territory, and customer requirements.

20 Claims, 8 Drawing Sheets

Related U.S. Application Data continuation of application No. 12/369,078, filed on Feb. 11, 2009, now Pat. No. 8,315,802.

(51) Int. Cl.
- *G06Q 50/30* (2012.01)
- *G01C 21/00* (2006.01)
- *G06Q 10/08* (2012.01)

(56) References Cited

U.S. PATENT DOCUMENTS

| | | | |
|---|---|---|---|
| 5,802,492 A * | 9/1998 | DeLorme | G01C 21/3476 340/990 |
| 5,913,917 A * | 6/1999 | Murphy | B60R 16/0232 701/123 |
| 5,974,356 A | 10/1999 | Doyle et al. | |
| 5,983,198 A | 11/1999 | Mowery et al. | |
| 6,356,838 B1 | 3/2002 | Paul | |
| 6,604,081 B1 | 8/2003 | Manning et al. | |
| 6,879,962 B1 | 4/2005 | Smith et al. | |
| 6,941,220 B2 * | 9/2005 | Le | G01C 21/3655 342/357.31 |
| 7,085,775 B2 | 8/2006 | Short, III et al. | |
| 7,209,829 B2 * | 4/2007 | Litvack | G01C 21/203 340/984 |
| 7,246,009 B2 | 7/2007 | Hamblen et al. | |
| 7,251,612 B1 | 7/2007 | Parker et al. | |
| 7,263,494 B1 * | 8/2007 | Harris | G06Q 10/02 235/384 |
| 7,680,595 B2 * | 3/2010 | Brinton | G08G 1/096805 340/995.19 |
| 7,756,615 B2 * | 7/2010 | Barfoot | G08G 1/20 180/168 |
| 2001/0023377 A1 * | 9/2001 | Wehrung | G05B 19/4182 700/230 |
| 2003/0004747 A1 | 1/2003 | Burton | |
| 2003/0078802 A1 | 4/2003 | Yonezawa | |
| 2003/0135304 A1 * | 7/2003 | Sroub | G06Q 10/08 701/1 |
| 2004/0107111 A1 | 6/2004 | Barts et al. | |
| 2004/0111339 A1 * | 6/2004 | Wehrung | G06Q 40/12 705/30 |
| 2004/0236498 A1 * | 11/2004 | Le | G01C 21/3655 701/440 |
| 2005/0159889 A1 * | 7/2005 | Isaac | G01C 21/3484 701/414 |
| 2005/0171835 A1 | 8/2005 | Mook et al. | |
| 2006/0064242 A1 * | 3/2006 | Litvack | G01C 21/203 701/410 |
| 2006/0116815 A1 | 6/2006 | Nomura | |
| 2006/0146719 A1 * | 7/2006 | Sobek | G01C 21/20 370/238 |
| 2006/0235739 A1 | 10/2006 | Levis et al. | |
| 2006/0241856 A1 | 10/2006 | Cobleigh et al. | |
| 2007/0129880 A1 | 6/2007 | Thacher | |
| 2007/0179709 A1 * | 8/2007 | Doyle | G01C 21/3453 701/417 |
| 2007/0198184 A1 * | 8/2007 | Yoshioka | G01C 21/32 701/426 |
| 2007/0198282 A1 | 8/2007 | Williams et al. | |
| 2007/0282618 A1 | 12/2007 | Barahona et al. | |
| 2007/0294031 A1 * | 12/2007 | Brinton | G08G 1/096805 701/527 |
| 2009/0048890 A1 * | 2/2009 | Burgh | G06Q 10/04 705/7.15 |
| 2009/0119001 A1 * | 5/2009 | Moussaeiff | G01C 21/005 701/532 |
| 2009/0157498 A1 * | 6/2009 | Seltzer | G01C 21/3415 705/14.69 |
| 2010/0057346 A1 * | 3/2010 | Ehrlacher | G01C 21/3461 701/533 |
| 2010/0169000 A1 * | 7/2010 | Overgoor | G06Q 10/083 701/465 |
| 2011/0231354 A1 * | 9/2011 | O'Sullivan | G08G 1/0104 706/46 |

OTHER PUBLICATIONS

Harrington, (Oct. 1999). High tech trucking improves fleet performance. Transportation & Distribution, 40(10), 53-62.

Hwang, Seung-Jun. (2005). Inventory constrained maritime routing and scheduling for multi-commodity liquid bulk. Ph.D. dissertation, Georgia Institute of Technology, United States—Georgia.

Sungur, I.. The robust Vehicle Routing Problem. Ph. D. dissertation, University of Southern California, United States—California.

\* cited by examiner

Direct Corporation
59 Main Street
New York, NY 10012
Route Manifest — 30

Work Date: 07/12/2000
Driver: 01 - Driver 01

C007 - STEVE CAVAGNARO
Vehicle: 01

| Work Order | Account-Name | Address | City/State | Phone/ Alt Phone | Priority | Estimated Times- Drive | Arrive | Work | Est. Dist. |
|---|---|---|---|---|---|---|---|---|---|
| Start: | | 59 TEC ST | HICKSVILLE, NY | Dispatch Time: METRICS, | 09:00 | | | | |
| 2009 | 2819-EDDIE KAIITA | 12 HILLCREST DR | WESTBURY, NY 11590-2448 | (516) 334-3704 (519) 334-2220 | Normal | 00:05 | 09:05 Hours: | 00:30 00:00-23:59 | 1.8 |
| Stop # 1 | Promotion CB, Claim ID 359960 REAR ENTRANCE.....BASEMENT. Work Code: REPAIR SERVICE EXS INST. | | | | | | | | |
| 2031 | 2820-DELORES CHILDS | 137 HAYES ST | GARDEN CITY, NY 11530-1004 | (516) 328-7987 | Normal | 00:10 | 09:45 Hours: | 01:00 00:00-23:59 | 6.7 |
| Stop # 2 | Promotion ONE RATE PLAN Work Code: BI SERVICE EXS INST. | | | | | | | | |
| 2001 | 2638-LARRY SILVERMAN | 320 ST. LUKE PLACE | FRANKLIN SQUARE, NY 11010- | (516) 616-5101 (519) 571-2090 | Normal | 00:05 | 10:50 Hours: | 01:30 00:00-23:59 | 2.3 |
| Stop # 3 | EVALUATE THE JOB. CUSTOMER SAYS THERE ARE HOLES EVERYWHERE AND WIRES ALL OVER THE PLACE DONE.BY ANTHONY 7/8/00 Work Code: WARRANTY TROUBLE EXS INST. | | | | | | | | |
| 2041 | 2829-MARYSE FRANCILLON | 741 N WILLIAM ST | NORTH BALDWIN, NY 11510-1434 | (516) 223-4237 | Normal | 00:10 | 12:30 Hours: | 01:30 00:00-23:59 | 4.3 |
| Stop # 4 | Promotion 1 RATE CUSTOMER ALREADY PAID 300.00 IN CASH AND PAY BALANCE IN INSTALL DATE. Work Code: REPAIR SERVICE EXS INST. | | | | | | | | |
| 2051 | 2837-WENDY WOODROFFE | 705 SUMMER AVE | UNIONDALE, NY 11553-3334 | (516) 565-2853 | Normal | 00:05 | 13:35 Hours: | 00:30 00:00-23:59 | 1.7 |
| Stop # 5 | ONE RECEIVER CANNOT GET ALL THE CHANNELS Work Code: SERVICE TROUBLE SERVICE | | | | | | | | |
| End: | | 59 TEC ST | HICKSVILLE, NY | | | 00:15 | 14:20 | | 8.6 |
| | 5 Work Orders, 5 Stops | | | | Totals: | 00:50 | | 04:30 | 25.5 |

SYSTEMS AND METHODS FOR ANALYZING THE USE OF MOBILE RESOURCES

BACKGROUND OF THE INVENTION

Field of the Invention

The present invention generally relates to dispatching and managing mobile resources, and more particularly relates to systems for automatically routing, scheduling, and dispatching mobile resources.

Description of the Related Art

Dispatching vehicles has traditionally been a demanding and time-consuming task. When preparing delivery manifests, conventional dispatchers are required to analyze the items to be delivered, the locations scheduled for delivery and the vehicle assets on-hand to create the delivery routes for the vehicles. A significant amount of time and money may be wasted when the most efficient delivery routes are not selected by the dispatcher.

There have been many attempts directed to automating vehicle dispatching to make the entire delivery process more efficient. For example, mobile resource management systems have been developed that use computers to automatically prepare delivery routes, delivery schedules, and calculate the optimal number of vehicles required for making all of the scheduled deliveries. One such system is sold by InterGis LLC of Torrington, Conn. under the trademark Visual Control Room™ (hereinafter "VCR system"). The VCR system includes a software package that is loaded onto a client's computer system to provide automatic dispatching including routing, scheduling, job tracking, and managing customer information. The VCR system provides a system that can be used to track one vehicle or an entire fleet of vehicles through a "visual" user interface. The VCR system provides route maps, manifests, status reports, and detailed customer information. The VCR system may be installed on a stand-alone computer or attached to a local area network in a customer operations center.

In one embodiment, the VCR system provides a listing of all of the day's deliveries on one main screen. An operator may click on any one of the individual records to review the customer history and the work related information. The VCR system includes color-coded work progress bars that show the control center the schedule for each truck or technician. Different colors in the status bar show drive times, work times, job completion and alerts for problem situations. At a glance, an operator of the VCR system may be able to determine the status and availability of all of the vehicles in a fleet operation.

In one embodiment, the VCR system uses colorful route maps and global positioning satellite tracking technology to display on one map all of the routes that have been dispatched, planned routes versus actual routes traveled by individual vehicles, and the real-time position of each vehicle, which is updated as changes occur.

The VCR system provides highly sophisticated, automated routing and scheduling capabilities that greatly diminish the time and effort required to organize routes. In the past, dispatchers have determined routes using paper maps and personal knowledge, which has proven to be a slow and tedious process. The VCR system configures the best schedules and routes for multiple vehicles automatically, within minutes, instead of hours. Based upon pre-selected work rule provided to the system, scheduled stops are automatically pulled from work orders and matched with the person or vehicle best suited to complete the job. Because the VCR program chooses the best sequence of all stops, which stops should be assigned to each vehicle, and the shortest distance to each stop, vehicle utilization is maximized, which adds profits to the operation.

In one embodiment, the VCR system includes a visual routing module or subroutine that automatically calculates the shortest distance between each stop, using real road mileage data. Mobile resources are given route manifests complete with turn-by-turn driving directions. In use, the VCR system has provided significant savings of 25% or more.

The VCR system may be used in any business or organization that has routing and scheduling needs. The system may be used for moving people, packages, products, or providing services, such as technical services. If an operation is required to get something or someone to different locations multiple times a day, the VCR system may save time and money, thereby maximizing profit for the operation.

In spite of the above advances, there remains a need for a diagnostic system, device, or tool that may be used in conjunction with a system such as the VCR system to enable potential customers to evaluate the value offered by the VCR system. Such as diagnostic system, device, or tool will preferably provide a system that a potential customer can try out for a period of time to evaluate the potential savings associated with using the VCR system. With the diagnostic analyzer on board, a potential customer will make deliveries as they always have. After a period of time, such as one week, the diagnostic analyzer will be interfaced with the VCR system so that the potential customer can see the actual routes driven by its mobile resources versus the optimized routes they could have driven to save time and money had they used the VCR system to prepare optimized routes and schedules.

SUMMARY OF THE INVENTION

In one embodiment, a mobile resource management system includes a diagnostic analyzer that enables an organization or individual to analyze the benefits that would be realized if the organization used the mobile resource management system for its mobile assets such as vehicles or individuals. In one embodiment, the diagnostic analyzer system includes a remote tracking stage and a computer analysis stage. During the remote tracking stage, a vehicle or a vehicles driver is preferably equipped with a device that acquires its earth position (longitude and latitude) from available global positioning satellites. Information related to the position and the time that the position was determined is transmitted to a receiving facility having the mobile resource management system, such as a VCR system described herein. The transmission may be done using cellular telephone technology, but may also be accomplished by other forms of communication such radio based transmission systems or cable based communication systems. In one embodiment, the recorded global positioning satellite data may be stored in the analyzer device rather than transmitted and conveyed to a computer system at a later time. The positions may be acquired, transmitted, or stored over any time period, such as a week or a month.

After the remote tracking process is completed, the computer system of the mobile resource management system is operated to receive the position and time data from the analyzer device used on the vehicle or carried by the vehicle's driver. The mobile resource management system may be used to analyze information recorded from one vehicle, or multiple vehicles or drivers.

In one embodiment, a second routine is run to evaluate the position and time data stored in the data base of the computer system. When two or more consecutive positions for the same driver or vehicle are found, the total elapsed time at a given position is recorded. A parameter value is specified for this process to identify which two positions are to be considered the same. A third routine may be run to extract the particular positions that have an elapsed time that exceeds a specified threshold value. This threshold value is passed as a parameter to this process. All positions extracted are identified as "stops." A fourth routine may be run for processing all of the "stops" for each individual vehicle or driver. This ordered set of stops is desirably identified as the "actual travel path" for the vehicle or driver. The first stop of the group of stops is considered to be the "origin" and the final stop is considered to be the "destination" so that the origin and destination locations may be specified by the computer system. The stops between the origin and the destination are re-ordered through the use of an algorithm, producing the shortest possible route for optimizing the use of time and/or resources. This ordered set of stops is identified as the "optimal travel path." The mobile resource management system then utilizes its data base and computers to execute a program that provides a plotting of the actual travel paths and the optimized paths, as recorded in the data base. Thus, a user is able to evaluate the efficiencies that may be gained by utilizing an automatic mobile resource management system versus using traditional dispatching techniques.

In one embodiment of the present invention, a system for analyzing the use of a mobile resource, such as vehicles or humans, includes a central processing unit adapted to receive a plurality of geographic locations and create an optimal travel route between the geographic locations, and an analyzer device incorporating global positioning satellite (GPS) technology that is positionable with a mobile resource for comparing an actual route traveled by the mobile resource with the optimal travel route created by the central processing unit. The central processing unit preferably has mobile resource management software stored therein adapted to use pre-selected criteria for creating the optimal travel route. The pre-selected criteria may include information related to time, distance, cost, load parameters, territory, and customer requirements. In one embodiment, the mobile resource management software includes the VCR system software described herein.

In one embodiment, the geographic locations may include a plurality of scheduled stops for delivering items or performing services. The central processing unit is preferably adapted to create an optimal travel route for efficiently reaching each of the scheduled stops using minimum resources.

In one embodiment, the analyzer device is adapted to be carried by the mobile resource as the mobile resource travels its actual travel route. The central processing unit preferably generates an output comparing resources used by the mobile resource when travelling the actual travel route versus resources that would be used by the mobile resource when travelling the optimal travel route. Thus, the central processing unit is capable of providing information regarding whether any resources may be saved (e.g. time, money) by using the mobile resource management system.

In one embodiment, the analyzer system, devices and tools of the present invention may be used to analyze the movement of a wide variety of mobile resources including trucks, cars, busses, vans, taxis, limousines, trains, motorcycles, bicycles, boats, ships, balloons, and planes.

In one embodiment, a system for analyzing the use of mobile resources includes a central processing unit adapted to receive a plurality of geographic locations and create one or more optimal travel routes between the geographic locations for the mobile resources, and a plurality of analyzer devices incorporating global positioning satellite (GPS) technology being positionable with each of the respective mobile resources for comparing actual routes traveled by the mobile resources between the geographic locations with the one or more optimal travel routes created by the central processing unit.

In one embodiment, the central processor preferably uses pre-selected criteria for creating the one or more optimal travel routes. The pre-selected criteria are desirably selected from the group of criteria consisting of time, distance, cost, load parameters, territory, and customer requirements. The mobile resources may include vehicles, aircraft, watercraft, animals, and humans.

In one embodiment, the central processing unit has mobile resource management software stored therein adapted to create an optimal travel route for each of the mobile resources for optimizing the efficiency of reaching each of the geographic locations. The analyzer devices desirably have communication systems for communication with the mobile resource management system such as wireless communication systems, radio wave communication systems, and cable communication systems. Each analyzer device may be carried by one of the mobile resources for periodically reporting the position of at least one of the mobile resources to the central processing unit.

In one embodiment, a system for analyzing the use of a mobile resource includes an analyzer device incorporating global positioning satellite (GPS) technology, the analyzer device being positionable with a mobile resource for recording data about an actual route of travel between a plurality of geographic locations, and a central processing unit in communication with the analyzer device for receiving the recorded data, and comparing the actual route of travel between the plurality of geographic locations with an optimal route of travel between the geographic locations created by the central processing unit. The central processing unit desirably includes routing and scheduling software that automatically creates optimized routes and schedules based upon pre-selected work rules. In one embodiment, the system is preferably adapted to create a plurality of optimized routes for a plurality of mobile resources, whereby each of the mobile resources has a unique optimized route associated therewith.

These and other preferred embodiments of the present invention will be described in more detail below.

DETAILED DESCRIPTION

Figure 1:
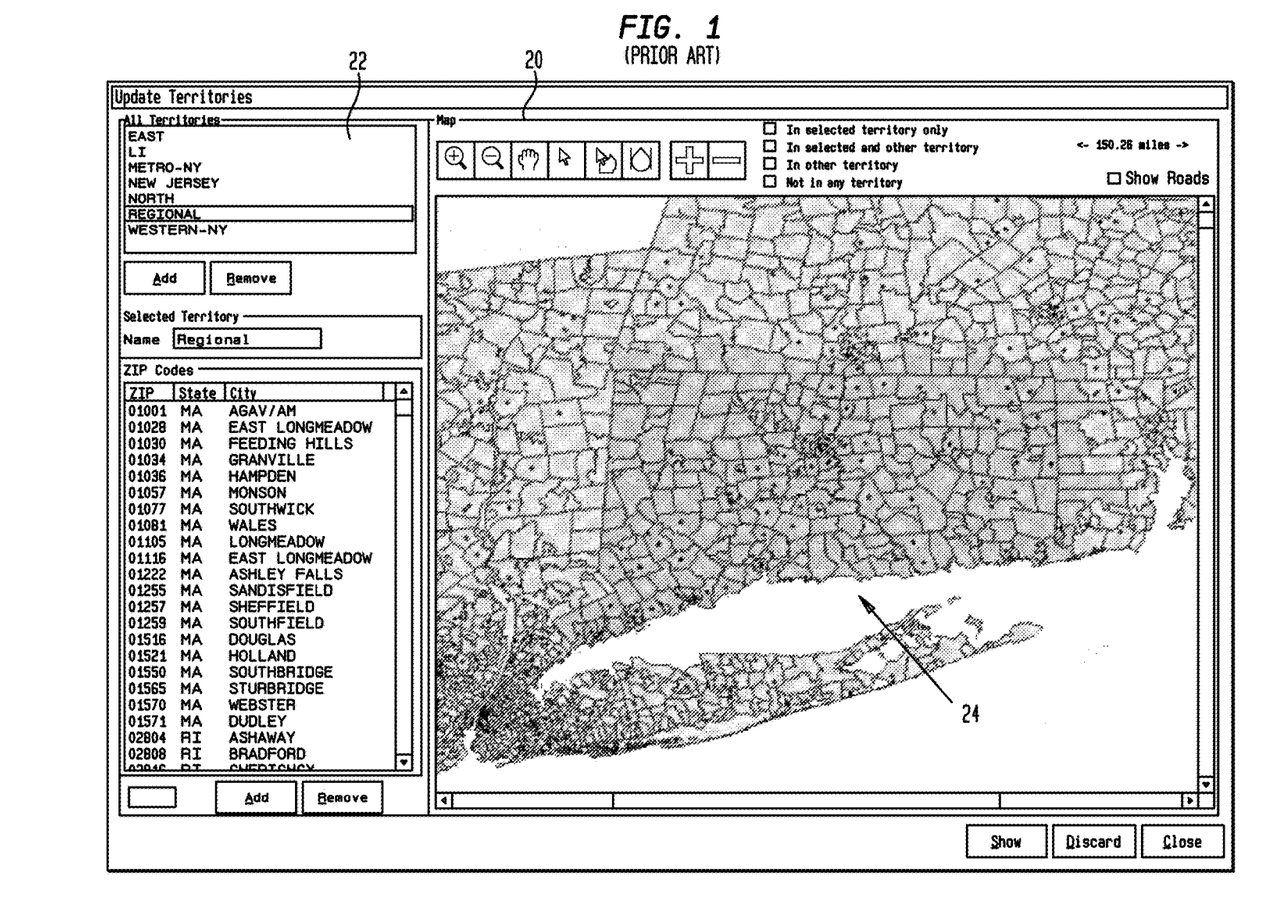
FIG. 1 shows a mapping screen of a mobile resource management system.

Referring to FIG. 1, a display screen 20 of a mobile resource management system includes a territory selection section 22 that enables an operator to select a territory 24. In the particular embodiment shown in FIG. 1, the operator has selected the territory designated "REGIONAL" that covers the entire state of Connecticut, a portion of southern Massachusetts, and a portion of eastern Rhode Island. After the desired territory has been selected, the mobile resource management system utilizes the selected territory when planning the most efficient dispatch routes for the scheduled deliveries.

Figure 2:
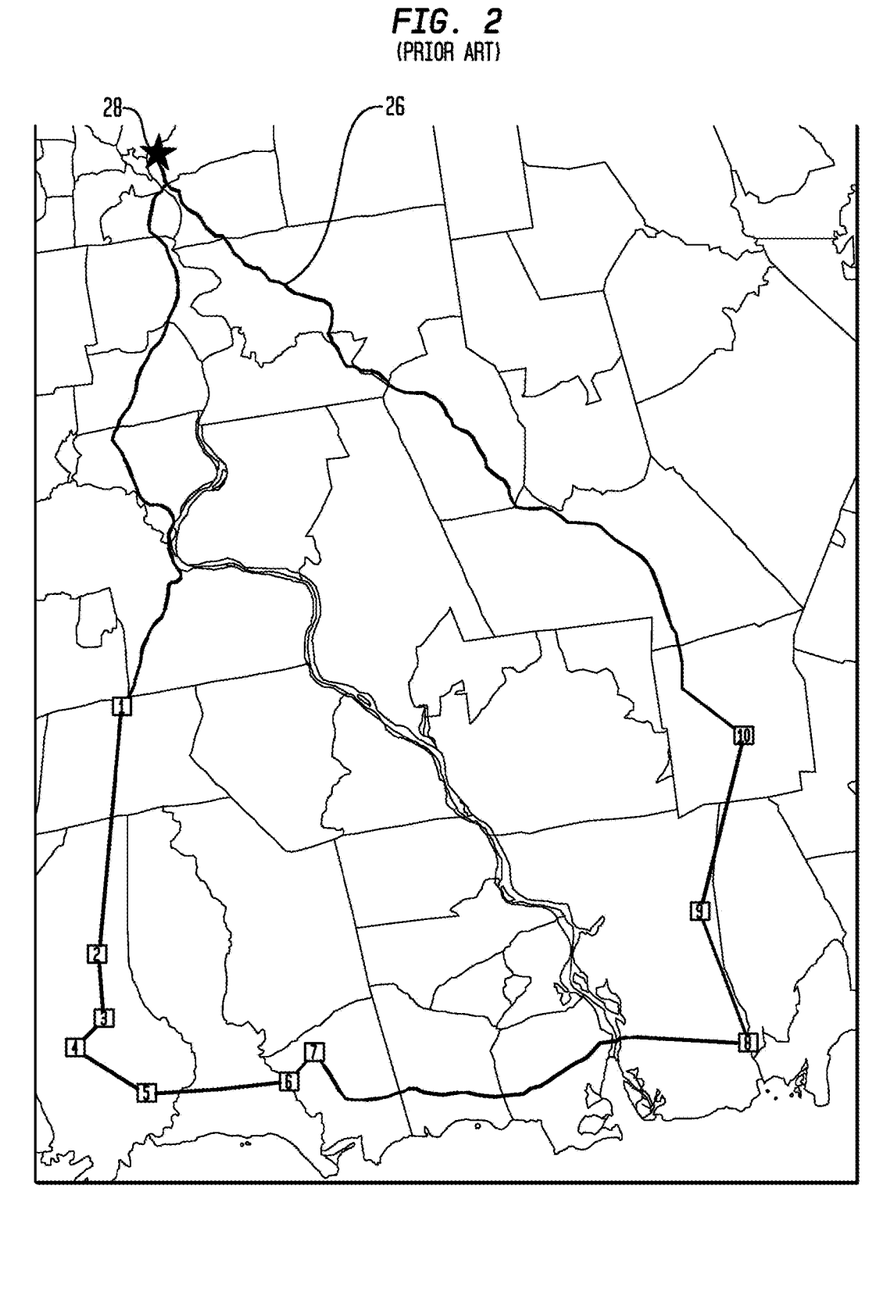
FIG. 2 shows a dispatch route created by a mobile resource management system.

FIG. 2 shows a single optimized route 26 that has been automatically created using the mobile resource management system. The automatically created optimized route 26 has a beginning point 28, which is also the end point of the route. The mobile resource management system automatically generates the optimized route 26, having stops numbered one (1) through 10, so that the stops are made in the most time efficient and cost efficient manner possible. Although only one optimized route is shown in FIG. 2, the mobile resource management system is capable of plotting multiple optimized routes for a plurality of vehicles.

Figure 3:
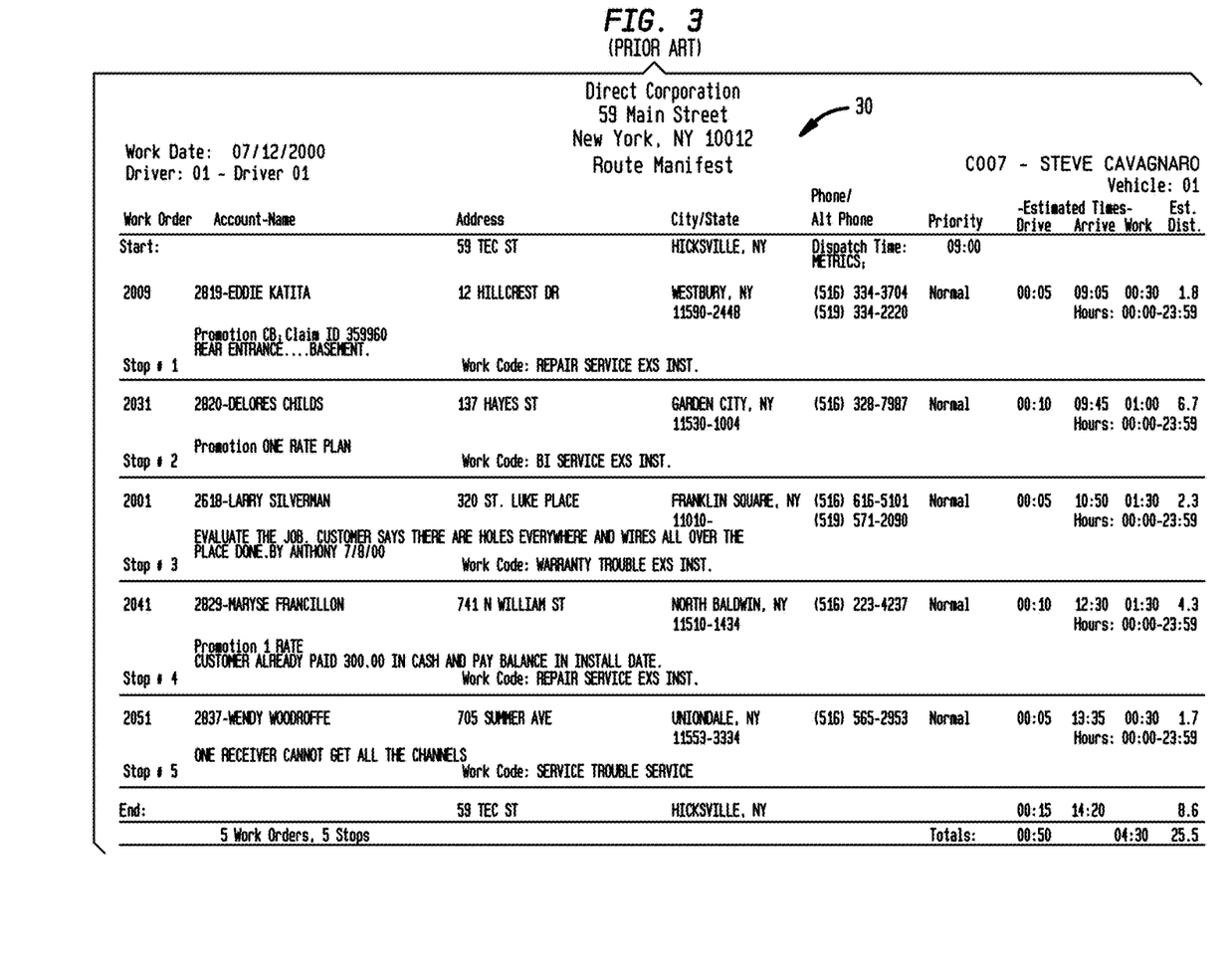
FIG. 3 shows a route manifest associated with the dispatch route shown in FIG. 2.

Referring to FIG. 3, after the mobile resource management system has created the optimized route, a route manifest 30 is generated for the driver, which is designated "DRIVER 01." The route manifest 30 provides a sequential listing of all of the stops, and may include the account name, the address, the city/state, the phone number of the account, the priority of the delivery, and the estimated time for driving, arriving, and working at each stop. A driver will complete the delivers most efficiently if he or she makes deliveries in the order provided on the route manifest.

Figure 4:
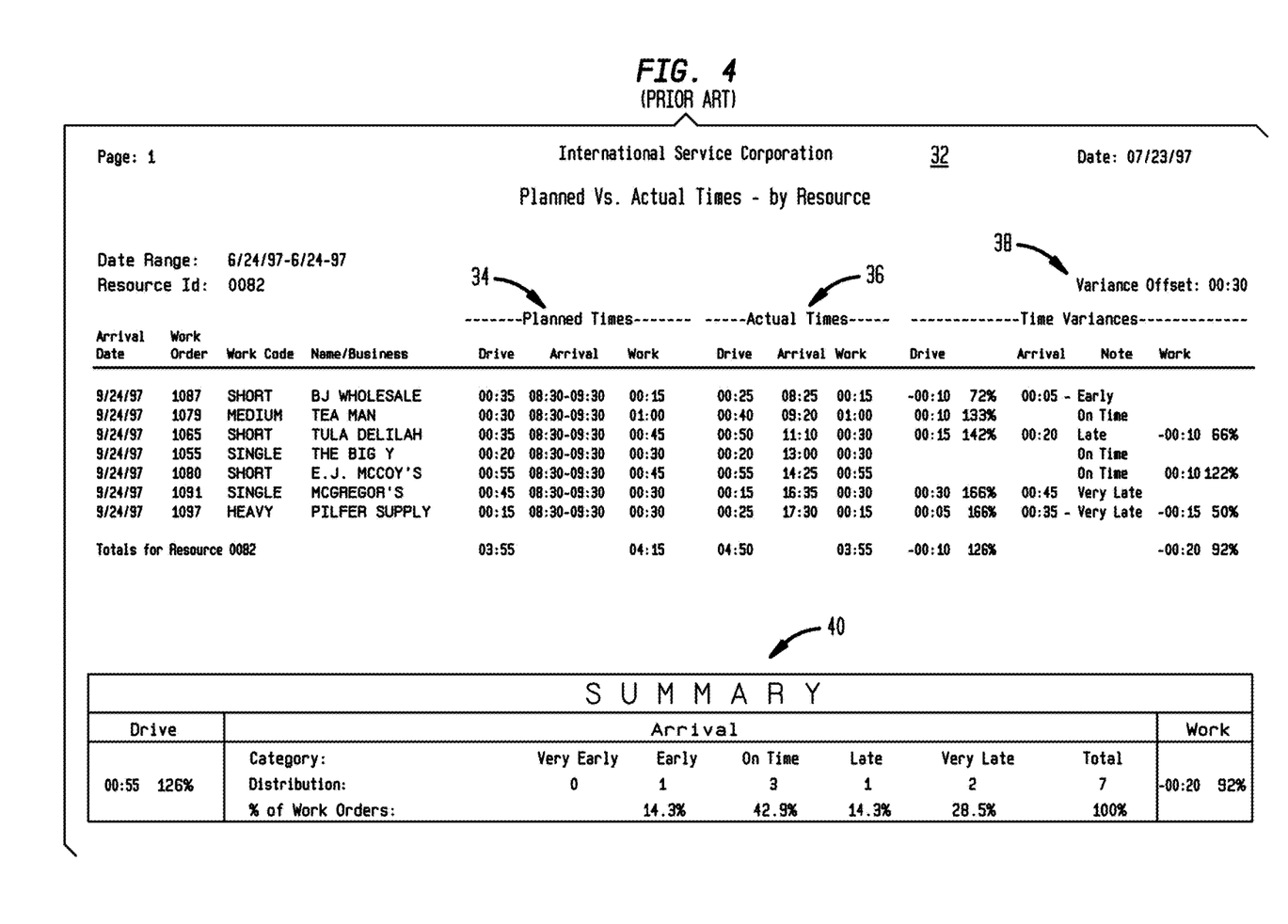
FIG. 4 shows a status report screen of a mobile resource management system.

Referring to FIG. 4, as the driver designated DRIVER 01 completes the delivers on the route manifest, the status of the deliveries is provided on a report screen 32 of the mobile resource management system. The report screen 32 provides an immediate and continuous status update as to the progress of the driver using the route manifest 32. The report screen 32 also preferably provides information regarding planned times for driving, arrival and work versus the actual time required for driving, arrival and work. The report screen 32 also preferably provides an indication of any variance 38 between the planned times and the actual times. The report screen 32 may also provide a summary section 40 that indicates whether the deliveries have been completed very early, early, on time, late, or very late. The summary section 40 also desirably provides information regarding the total number of deliveries made and the percent of work orders completed.

Figure 5:
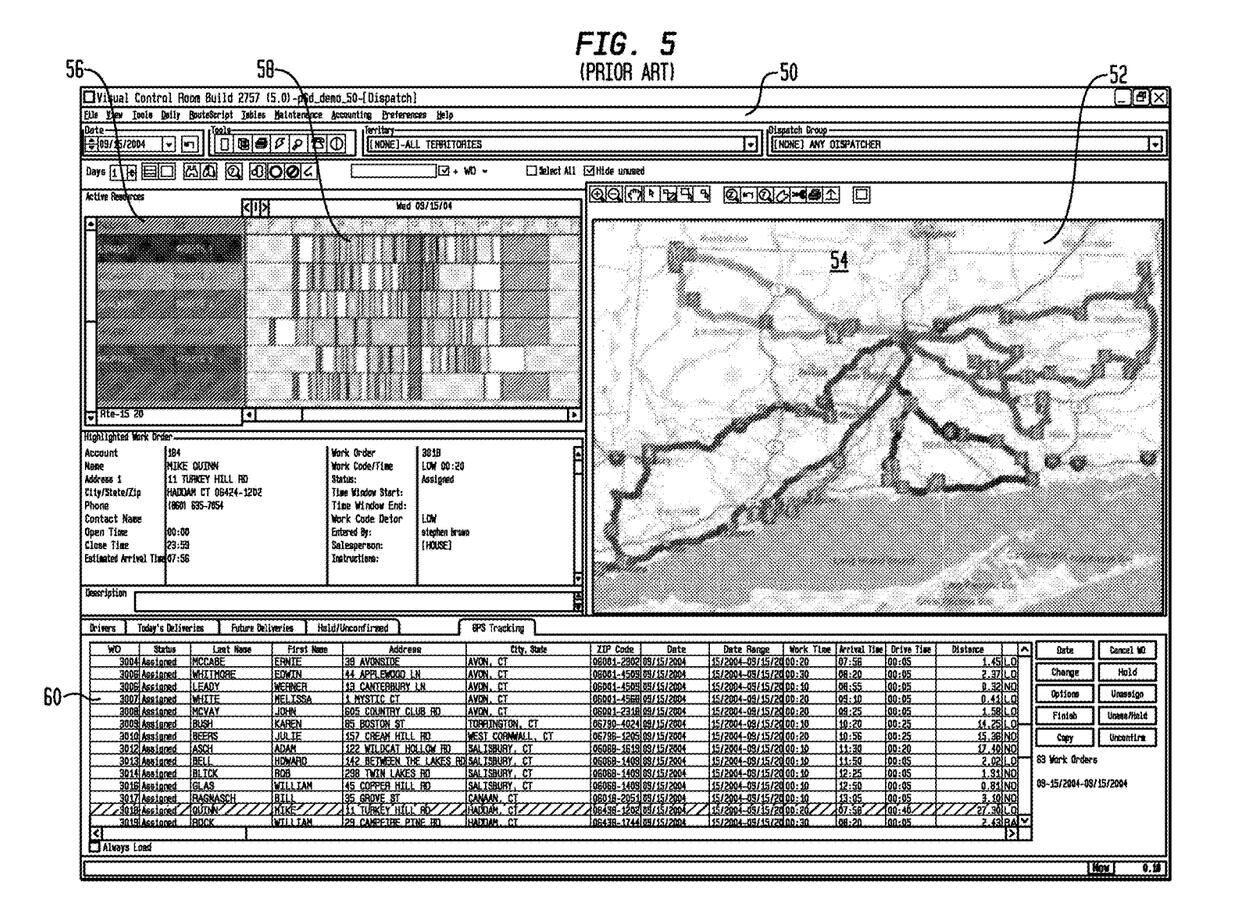
FIG. 5 shows multiple dispatch routes on a display screen of a mobile resource management system.

Referring to FIG. 5, the mobile resource management systems preferably includes a multi-user display screen 50 that has a mapping region 52 that displays the multiple dispatch routes that have been created by the system. In FIG. 5, the mapping region 52 of the display screen shows seven different optimized delivery routes that have been created by the mobile resource management system. The optimized delivery routes may be plotted on the map on the display screen. Each of the optimized routed may have a different color so that the routes may be distinguished from one another. The different routes are created by the mobile resource management system so as to maximize the efficiency of making all of the scheduled stops. Each individual optimized route has stops numbered sequentially from one (1) to the last number on the route to provide a complete route originating and ending at start point 54.

Referring to FIG. 5, the multi-user display screen 50 also preferably includes a route list region 56 that provides an identification of each route that has been dispatch and the driver associated with each vehicle on the route. The route list region 56 also desirably includes a scheduled time of delivery display 58 for each route that shows when particular activities should occur (e.g. estimated driving time, estimated arrival time, and estimated work time).

The multi-user display screen 50 includes a route manifest section 60 that provides more particularized information about each of the stops to be made on each of the plotted routes.

Figure 6:
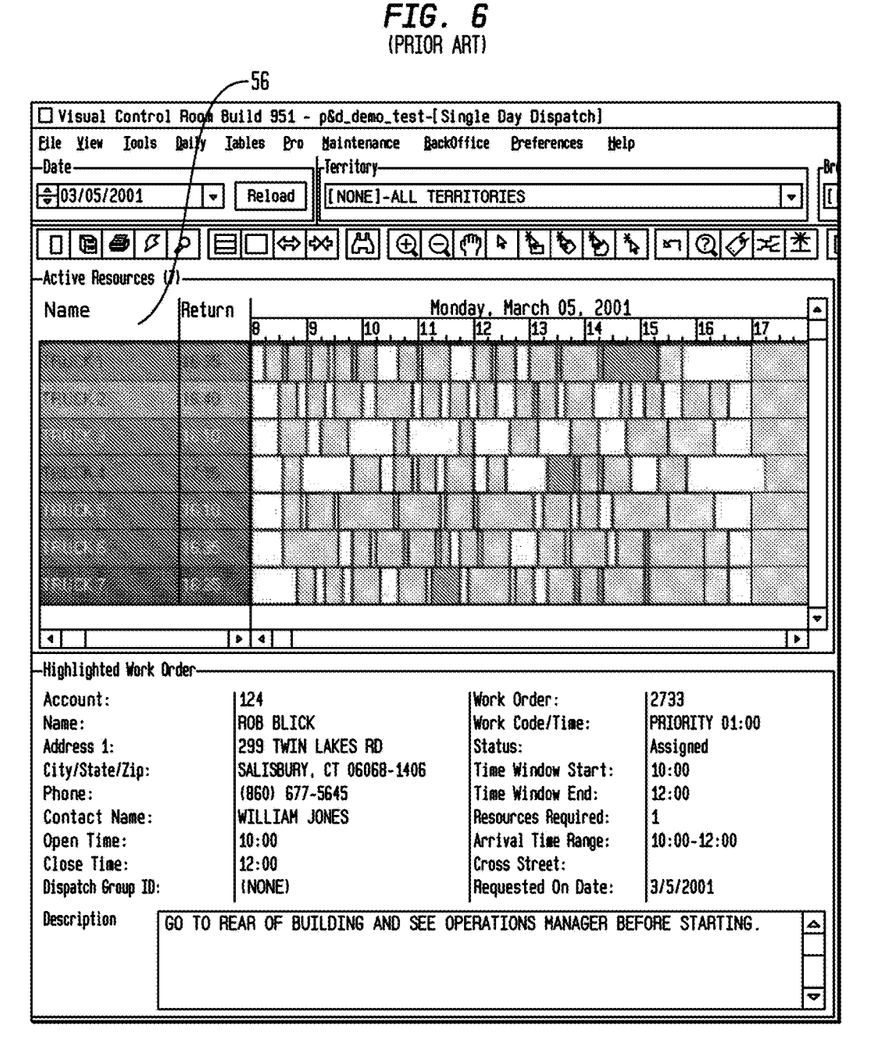
FIG. 6 shows a display screen of a mobile resource management system depicting a dispatch list for a plurality of vehicles.

Referring to FIG. 6, the route list region 56 of the multi-user display screen 50 (see FIG. 5) includes a listing of all of the optimized routes plotted using a mobile resource management system. In the particular embodiment shown in FIG. 6, seven different optimized routes have been plotted, whereby each route is associated with a particular driver. Each of the plotted, optimized routes may also provide an indication of an estimated time of return to the start point and a plotting of the time schedule for each route. As such, an operator at a display screen is preferably able to monitor the scheduled stops for each truck as well as the status of the deliveries for each truck.

Figure 7:
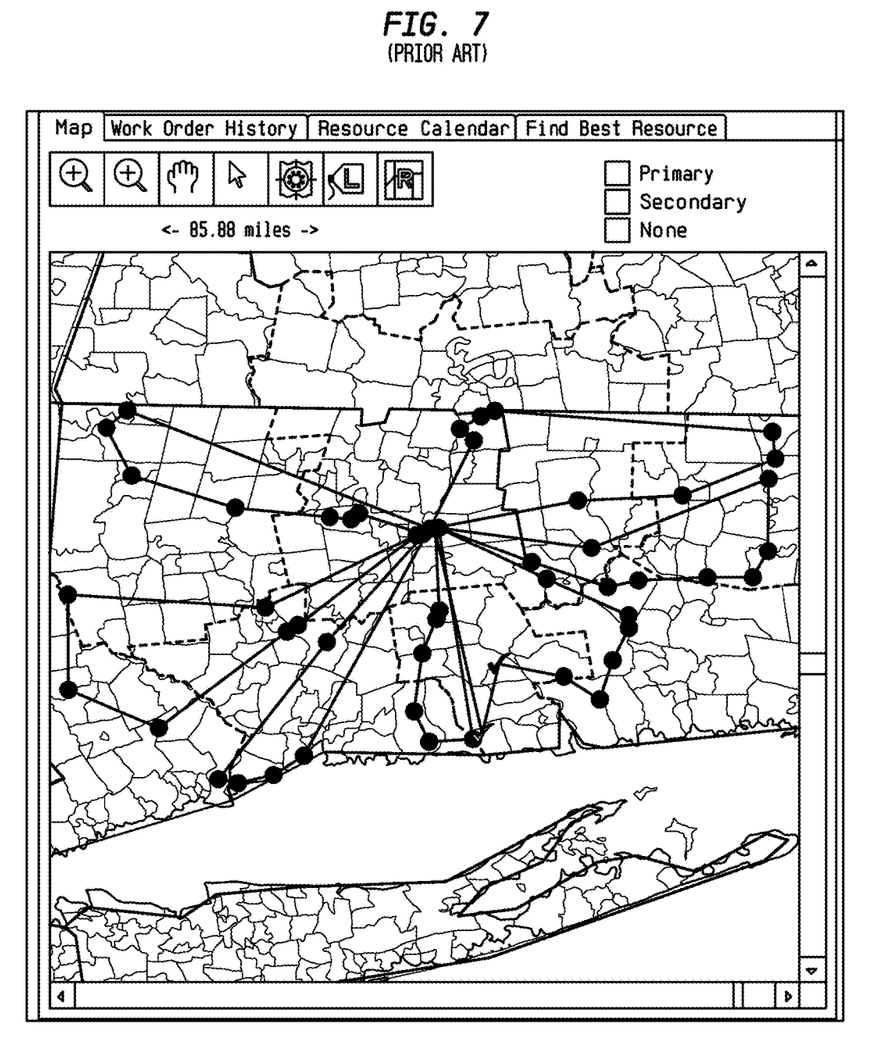
FIG. 7 shows a re-routing dispatch list created by a mobile resource management system.

Referring to FIG. 7, the multiple resource management system may periodically update the optimized routes in response to problems, delays, and/or changes in the progress of deliveries. As shown in FIG. 7, if one of the routes is being completed more efficiently or less efficiently, the mobile resource management system may re-plot the optimized routes to change one or more of the routes. The system may automatically update the dispatch route for each of the vehicles. Thus, one route may lose one or more scheduled stops, and another route may gain one or more scheduled stops. The scheduled stops may be transferred between the various routes to insure that all of the scheduled deliveries are completed on time, at the appropriate time, and/or by the end of the delivery day.

By using the mobile resource management system disclosed herein, an organization making deliveries will be able to automatically calculate and plot the optimized delivery routes used by the organizations vehicles. The mobile resource management system will preferably determine the most efficient routes for the various vehicles. The mobile resource management system will also desirably calculate how many vehicles are required to be on the road to complete all of the scheduled deliveries. Because the system completes dispatching automatically, the mobile resource management system is able to complete dispatching in minutes as opposed to hours. Moreover, the mobile resource management system enables organizations to complete its deliveries in the most efficient manner possible, saving time and resources. The mobile resource management system is adapted to automatically update the dispatch routes in response to the status of each vehicle and how the vehicles are progressing in making all of the scheduled deliveries.

Figure 8:
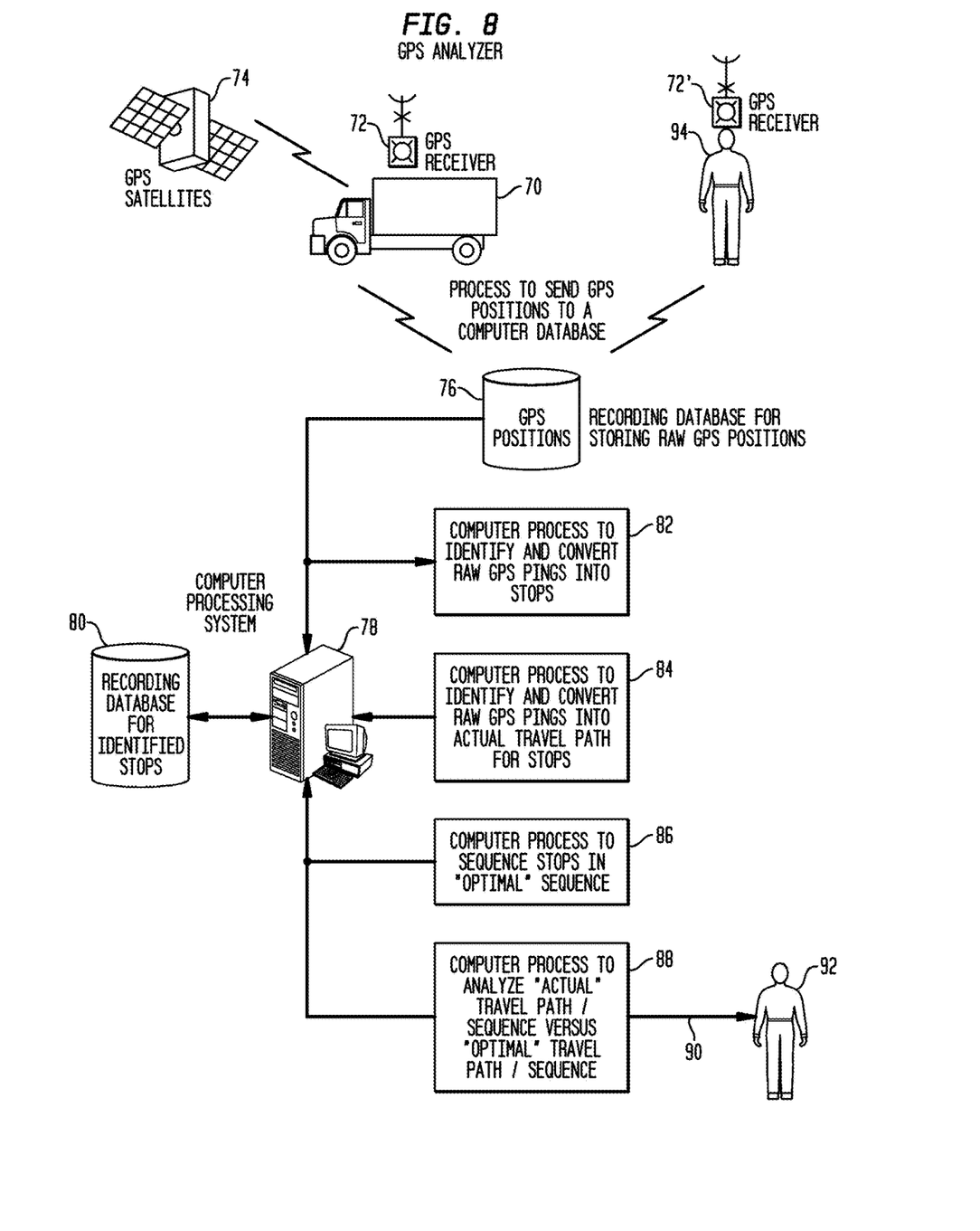
FIG. 8 shows a system for analyzing mobile resources, in accordance with one embodiment of the present invention.

Referring to FIG. 8, in one embodiment of the present invention, a mobile resource management system includes systems, devices, and methods for analyzing the efficiency of a mobile resource as the mobile resource completes its assigned dispatched route. In one embodiment, an analyzer system or device is carried by an individual or vehicle and the individual or vehicle makes its normal deliveries during a designated period of time, such as a day, a week or a month. After the designated period of time has elapsed, the analyzer device is preferably placed in communication with the mobile resource management system and a comparison is made between the routes actually travelled by the vehicle and the optimized routes that would have been travelled by the vehicle had the vehicle utilized the mobile resource management system. The mobile resources management system preferably generates a report regarding the savings that would be realized had the mobile resource management system been utilized. Thus, the analyzer system of the present invention desirably enables an organization to evaluate the efficiency of its dispatching operations and to determine whether it may be beneficial to begin using the mobile resource management system to improve its route planning operations.

Referring to FIG. 8, in one embodiment, a vehicle 70 is equipped with an analyzer system 72 that incorporates global positioning satellite (GPS) technology. The vehicle 70 then performs its scheduled deliveries during a period of time, such as a week. As the vehicle 70 completes its deliveries, the analyzer system 72 is in communication with a global positioning satellite 74 via the incorporated GPS technology. At stage 76, the GPS positions of the vehicle 70 are recorded and sent to a computer database 78 for later analysis. The computer database 78 records all of the identified stops in a memory 80.

As the vehicle 70 makes its various stops, the computer 78 performs various routines and/or sub-routines to identify and convert the raw GPS pings into stops, as shown as stage 82. At the stage designated 84, the computer program identifies and converts the raw GPS pings into an actual travel path for the stops. At the stage designated 86, the computer analyzes the various stops and places the stops in an optimal sequence. At stage 88, the system analyzes the actual path travelled by the vehicle 70 versus the optimal path that should have been travelled by the vehicle 70 for optimizing the use of time and resources. The system then generates an output 90 that may be provided to an individual 92 to present a comparison of the actual travel path of the vehicle 70 versus an optimized travel path that could have been used to perform the stops in a more efficient and timely manner. The output 90 will provide the individual 92 with information regarding the value added to the organization by acquiring the mobile resource management system disclosed herein. Thus, the individual 92 does not need to purchase the mobile resource management system disclosed herein without first experiencing first-hand how the system may improve delivery operations and save money for the organization. The present invention also provides an analysis system for organizations seeking to evaluate its dispatching and delivery operations, and seeking to determine whether same may be conducted more efficiently.

In one embodiment, deliveries and/or stops may be made by individuals 94 rather than by vehicles. In these embodiments, the individual 94 may carry on his or her body an analyzer system or device 72' that incorporates global positioning satellite technology. The individual 94 will then make his or her designated deliveries and/or stops during a period of time, such as a week. The analyzer system or device will perform the same functions described above as the analyzer system 72 provided on the vehicle 70. At the end of the pre-determined evaluation period, the mobile resource management system will generate a report that compares the actual travel path and/or stop sequence utilized by the individual 94 versus the more efficient, optimized travel path and/or stop sequence that is generated by the mobile resource management system. Thus, an individual may be able to see first-hand the value of utilizing a mobile resource management system of the present invention versus utilizing conventional dispatch techniques, and obtain an analysis of whether the individual is making his or her scheduled stops in the most efficient manner possible.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

While the foregoing is directed to embodiments of the present invention, other and further embodiments of the invention may be devised without departing from the basic scope thereof. As such, the scope of the present invention is to be limited only as set forth in the appended claims.

What is claimed is:

1. A system for analyzing the use of a fleet of mobile resources comprising:
a fleet of mobile resources, each mobile resource of the fleet of mobile resources comprising an analyzer device comprising a global positioning satellite (GPS) receiver and a communication device, the analyzer device configured to determine and transmit raw GPS ping data of the GPS receiver; and
at least one central processing unit comprising:
a memory comprising computer-executable instructions;
a recording database configured to receive and store the raw GPS ping data transmitted by the analyzer device, and
a computer database comprising identified stop information converted from the raw GPS ping data,
wherein the computer-executable instructions, when executed, configure the at least one central processing unit to:
receive periodically in real-time the raw GPS ping data of an actual route traveled by a first mobile resource of the fleet of mobile resources;
identify and convert the raw GPS ping data into two or more stops associated with the actual route based, in part, on an analysis of the raw GPS ping data of an actual sequence of stops taken in the actual route traveled by the first mobile resource;
identify and convert the raw GPS ping data into the actual route for the two or more stops;
generate a first optimal route between the two or more stops comprising a first optimal sequence for the two or more stops for the first mobile resource;
generate a second optimal route between the two or more stops comprising a second optimal sequence for the two or more stops for a second mobile resource of the fleet of mobile resources that is available in real-time, the second mobile resource being a different type of mobile resource than the first mobile resource,
wherein the first and second optimal routes are based, in part, on the actual route traveled by the first mobile resource, each of the first and second optimal routes differing at least in part from the actual route traveled by the first mobile resource, wherein the actual route is traveled by the first mobile resource prior to generation of the first and second optimal routes;

analyze the actual route traveled and the first and second optimal routes to determine usage of at least one criterion that would have been reduced during each of the first and second optimal routes compared to the actual route;

compare the usage of the at least one criterion by the first mobile resource when traveling the actual route with the usage of the at least one criterion by the first and second mobile resources when travelling the first and second optimal routes respectively; and generate an output of a comparison of the usage of the at least one criterion by the first mobile resource for the actual route and the usage of the at least one criterion by the first and second mobile resources for the first and second optimal routes respectively.

2. The system as claimed in claim 1, wherein said at least one central processing unit is further configured to create the first and second optimal routes using pre-selected criteria.

3. The system as claimed in claim 2, wherein the pre-selected criteria include at least one from a group consisting of time, distance, cost, load parameters, territory, or customer requirements.

4. The system as claimed in claim 1, wherein the two or more stops comprise a plurality of schedule stops for delivering items or performing services.

5. The system as claimed in claim 4, wherein the at least one central processing unit is further configured to automatically generate the first and second optimal routes in order to reach each scheduled stop of the plurality of scheduled stops using minimum resources.

6. The system as claimed in claim 1, wherein the analyzer device is adapted to be carried by the first mobile resource as the first mobile resource travels the actual route.

7. The system as claimed in claim 4, wherein said at least one central processing unit is further configured to determine a number of mobile resources required to efficiently complete the plurality of scheduled stops.

8. The system as claimed in claim 1, wherein said first and second mobile resources are selected from a group consisting of vehicles, aircraft, watercraft, and humans.

9. The system as claimed in claim 8, wherein said vehicles are selected from a group of vehicles consisting of trucks, cars, busses, vans, taxis, motorcycles, bicycles, boats, ships, balloons, and planes.

10. A method of analyzing usage of a fleet of mobile resources using one or more hardware processors configured with specific computer-executable instructions, the specific computer-executable instructions stored in an electronic hardware memory, each mobile resource of the fleet of mobile resources comprising an analyzer device comprising a global positioning system (GPS) receiver and a communication device, the method comprising:

receiving positional information of an actual route traveled by a first mobile resource of the fleet of mobile resources wherein the positional information comprises raw GPS ping data received during operation of the first mobile resource on the actual route;

determining two or more geographic locations associated with the actual route based, in part, on an analysis of the positional information of the actual route traveled by the first mobile resource;

automatically generating a first optimal route for the first mobile resource between the two or more geographic locations based, in part, on the positional information of the actual route traveled by the first mobile resource, the first optimal route differing at least in part from the actual route traveled by the first mobile resource, wherein the actual route is traveled by the first mobile resource prior to generation of the first optimal route;

automatically generating a second optimal route for a second mobile resource of the fleet of mobile resources between the two or more geographic locations based, in part, on the positional information of the actual route, the second optimal route differing at least in part from the actual route and the second mobile resource being a different type of mobile resource than the first mobile resource;

analyzing the actual route traveled and the first and second optimal routes to determine usage of at least one criterion that would have been reduced during each of the first and second optimal routes compared to the actual route;

comparing the usage of the at least one criterion by the first and second mobile resources when travelling the first and second optimal routes respectively to the usage of the at least one criterion by the first mobile resource when travelling the actual travel route; and generating an output of a comparison of the usage of the at least one criterion by the first mobile resource for the actual route and by the first and second mobile resources for the first and second optimal routes respectively.

11. The method of claim 10, wherein the two or more geographic locations comprise a plurality of scheduled stops for delivering items or performing services.

12. The method of claim 11, further comprising generating the first and second optimal routes using minimum criteria to reach each scheduled stop of the plurality of scheduled stops.

13. The method of claim 11, further comprising determining a number of mobile resources required to efficiently complete the plurality of scheduled stops.

14. The method of claim 11, further comprising periodically receiving a position of the first mobile resource from the analyzer device.

15. The method of claim 10, wherein pre-selected criteria are used in generating the first and second optimal routes.

16. The method of claim 15, wherein the pre-selected criteria are selected from a group consisting of time, distance, cost, load parameters, territory, and customer requirements.

17. Non-transitory physical computer storage comprising computer-executable instructions stored thereon that, when executed in one or more processors, are configured to execute operations comprising:

identifying a fleet of mobile resources, each mobile resource of the fleet of mobile resources comprising an analyzer device comprising a global positioning system (GPS) receiver and a communication device;

receiving positional information of an actual route traveled by a first mobile resource of the fleet of mobile resources, wherein the positional information comprises raw GPS ping data received during operation of the first mobile resource on the actual route;

determining two or more geographic locations associated with the actual route based, in part, on an analysis of the positional information of the actual route traveled by the first mobile resource;

automatically generating a first optimal route between the two or more geographic locations based, in part, on the positional information of the actual route traveled by the first mobile resource, the first optimal route differing at least in part from the actual route traveled by the first mobile resource, wherein the actual route is traveled by the first mobile resource prior to generation of the first optimal route;

automatically generating a second optimal route for a second mobile resource of the fleet of mobile resources between the two or more geographic locations based, in part, on the positional information of the actual route traveled by the first mobile resource, the second optimal route differing at least in part from the actual route traveled by the first mobile resource, the second mobile resource being a different type of mobile resource than the first mobile resource;

analyzing the actual route traveled and the first and second optimal routes to determine usage of at least one criterion that would have been reduced during each of the first and second optimal routes compared to the actual route; and generating an output comparing the usage of the at least one criterion by the first and second mobile resources when travelling the first and second optimal routes respectively as compared to the usage of the at least one criterion by the first mobile resource when travelling the actual route.

18. The non-transitory physical computer storage of claim 17, wherein the analyzer device is configured to periodically report a position of the first mobile resource to the computer system.

19. The non-transitory physical computer storage of claim 17, wherein the communication device is selected from a group of communication systems consisting of wireless communication systems; radio wave communication systems, and cable communication systems.

20. The non-transitory physical computer storage of claim 17, wherein the at least one criterion is at least one of time or money.

* * * * *